United States Patent [19]

Morimura et al.

[11] Patent Number: 5,760,843
[45] Date of Patent: Jun. 2, 1998

[54] METHOD AND APPARATUS FOR CONTRAST PROCESSING A VIDEO SIGNAL INCLUDING BRIGHTNESS LEVEL COMPENSATION

[75] Inventors: Atsushi Morimura, Nara; Takeo Azuma, Osaka, both of Japan

[73] Assignee: Matsushita Electric Industrial Co., Ltd., Osaka, Japan

[21] Appl. No.: 693,461

[22] Filed: Aug. 7, 1996

Related U.S. Application Data

[63] Continuation of Ser. No. 183,695, Jan. 19, 1994, abandoned.

[30] Foreign Application Priority Data

Jan. 19, 1993 [JP] Japan .................................. 5-006395
Jan. 19, 1993 [JP] Japan .................................. 5-006396

[51] Int. Cl.$^6$ .............................. H04N 5/52; H04N 5/57; H04N 5/58
[52] U.S. Cl. .............................. 348/678; 348/603
[58] Field of Search ...................... 348/255, 678, 348/687, 690, 691, 602, 603; H04N 5/52, 5/57, 5/58

[56] References Cited

U.S. PATENT DOCUMENTS

| | | | |
|---|---|---|---|
| 4,489,349 | 12/1984 | Okada | 358/168 |
| 4,731,865 | 3/1988 | Sievenpiper | 348/687 |
| 4,769,708 | 9/1988 | Stoughton | 358/161 |
| 5,083,198 | 1/1992 | Haferl et al. | 358/32 |
| 5,200,829 | 4/1993 | Lagoni | 348/687 |
| 5,410,364 | 4/1995 | Karlock | 348/678 |

FOREIGN PATENT DOCUMENTS 6217234  8/1994  Japan .......................... H04N 5/58

OTHER PUBLICATIONS

V. O'Brien, "Contour Perception, Illusion and Reality", Journal of the Optical Society of America, vol. 48, No. 2, pp. 112–119, Feb. 1958.

D. Burr, "Implications of the Craik-O'Brien Illusion for Brightness Perception", Vision Research, vol. 27, No. 11, pp. 1903–1905 and 1907–1913.

*Primary Examiner*—John K. Peng
*Assistant Examiner*—Nathan J. Flynn
*Attorney, Agent, or Firm*—Ratner & Prestia

[57] ABSTRACT

A method and an apparatus performs contrast processing so that the contrast of a video signal displayed on a low contrast display device is improved. The apparatus and method prevent the picture from becoming whitish and from having its apparent contrast reduced, even when external light is present. The apparatus comprises a brightness level converting part for converting the brightness level of a picture to a brightness level which can be displayed with a low contrast display device. The apparatus further includes a contrast improving part for improving the contrast by superimposing a waveform on the input signal to create an optical illusion of a brightness level. A brightness level compensating part is also provided for compensating the brightness value of the light and dark parts of the brightness varying portions in the video input signal so that the light parts get darker and the dark parts get lighter.

45 Claims, 19 Drawing Sheets

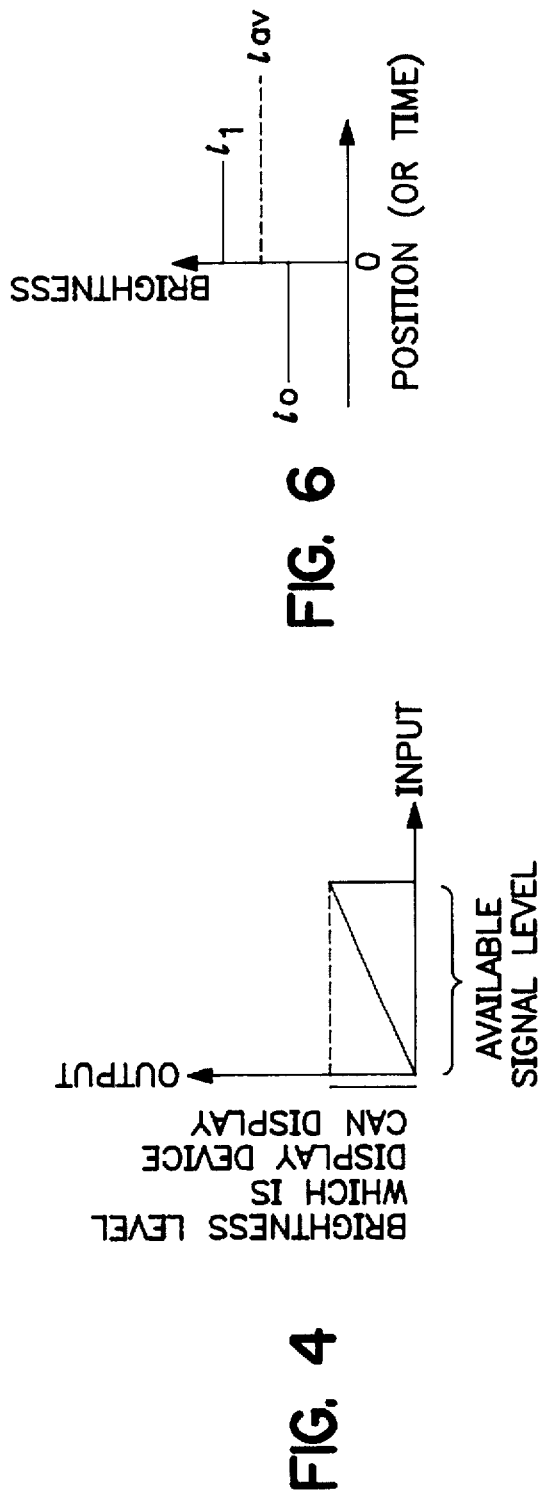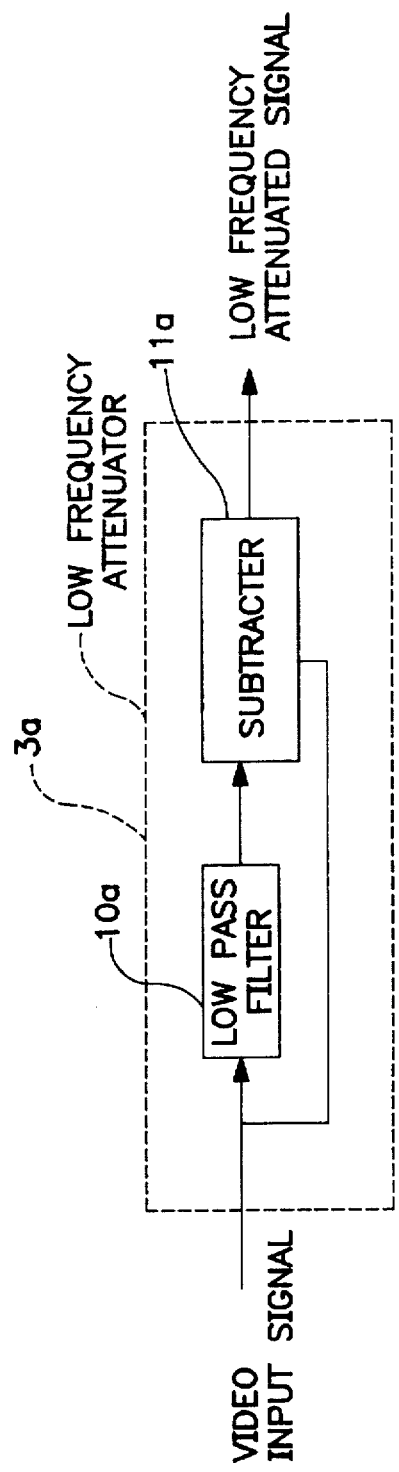
FIG. 6
FIG. 4
FIG. 5

METHOD AND APPARATUS FOR CONTRAST PROCESSING A VIDEO SIGNAL INCLUDING BRIGHTNESS LEVEL COMPENSATION

This is a continuation of application Ser No. 08/183,695 filed Jan. 19, 1994, now abandoned.

BACKGROUND OF THE INVENTION

1. Field of the Invention

The present invention relates to a method and an apparatus which reduces dark areas of a picture which become whitish or which cause a decrease in contrast. The present invention further relates to improving the apparent contrast of a displayed picture even if the displayed picture is exposed to external light.

2. Description of the Prior Art

A technique which compensates for deviation of a signal dynamic range is disclosed, for example, in Japanese Patent Publication 01-222382, incorporated herein by reference, which uses a histogram equalization technique. FIG.1 shows a block diagram of a contrast processing apparatus in accordance with the prior art. FIGS. 2(a)–2(c) show how a video signal with high dynamic range is compressed in accordance with the prior art.

In FIG. 1, a data conversion table for histogram equalization is generated at a data conversion table generator 105 using a histogram which is generated at histogram generator 101. The data conversion table makes the slant of the conversion table (conversion characteristic of the signal level) steep at a part where the frequency of the video signal level is high.

FIG. 2(b) illustrates an example of a histogram of video input signal level. A conversion table is made which makes the slant of the conversion characteristic of the signal level large at the high frequency parts between 10 and 20% and between 80 and 90% of the signal level. The conversion table also makes the slant of the conversion characteristic of the signal level small at the low frequency part between 20 and 70% of the signal level. FIG. 2(a) illustrates the conversion table in a graphic form. It corresponds to an accumulative histogram expressed in percentage. The distribution of the inputted video signal level is made uniform by a data converter 106 using the characteristic of the above-mentioned conversion table.

When the video signal of FIG. 2(b) is histogram-equalized with the conversion characteristic shown in FIG. 2(a), the histogram of the video input signal is converted as shown in FIG. 2(c). Thus, the histogram of the video input signal level is converted and the graduation characteristic is improved. Although the graduation is improved, the histogram of the video input signal level greatly much. Accordingly, a process to reduce the variation is constructed. This process is performed by a histogram compressor 102, a subtracter 103 and an adder 104 which make a distribution of the histogram uniform for making a conversion table and which makes the histogram equalization smooth.

In the circuit configuration shown in FIG. 1, the histogram of the video input signal level is uniform. However, the circuit configuration of FIG. 1 does not address the problem where the picture displayed on a display device gets whitish or has reduced contrast caused by the influence of external light. Consequently, when external light is considered, the displayed picture produced by the apparatus of FIG. 1 gets whitish and becomes difficult to watch because of lack of apparent contrast.

The present invention relates to resolving the above-mentioned problem, and to preventing a picture from getting whitish or having less contrast. The present invention also relates to a method and an apparatus for contrast processing to improve contrast on a low contrast display device with a narrow dynamic range.

SUMMARY OF THE INVENTION

The present invention relates to a method and an apparatus for contrast processing featuring a waveform which creates an optical illusion of a brightness level. The optical illusion is created by superimposing the waveform on an image so the brightness level of the image is converted to a brightness level which can be displayed on a low contrast display device. The present invention further relates to detecting the brightness level and the distribution of the brightness variation of the video input signal. The brightness varying point of the input signal with a high brightness value is compensated so that it gets dark, and the brightness varying point of the input signal with a low brightness value is compensated so that it gets light. As a result, the apparent (psychological) contrast of the image displayed on a display device having a narrow dynamic range and less contrast is improved.

The contrast processing apparatus of the present invention includes, (1) a brightness level converting means for converting the video signal level so that the gain of parts of the video signal, where the ratio of self emitting light to external light is small when displaying a picture on a display device, is increased, (2) a low frequency component attenuating means for extracting varying components from the output of the brightness level converting means, (3) a characteristic converting means for compressing the parts, where output amplitude of the low frequency component attenuating means is large, and (4) an adding means for adding the output of the characteristic converting means and the output of the brightness level converting means.

The above-mentioned configuration, has an advantage of improving the apparent (psychological) contrast of the picture which is displayed on a low contrast display device by superposing a waveform on the input signal. This creates an optical illusion of a brightness level on a video input signal. In addition, the brightness level of the picture can be automatically set to a brightness level which is easier to display on the display device. This is accomplished by detecting the brightness levels and distribution of the brightness variation of the video input signal and by compensating for the brightness level so that some light parts with brightness variation get dark and some dark parts with brightness variation get bright. The above embodiment addresses the situation when external light is not considered.

In the case in which external light is considered, the present invention relates to preventing the picture from getting whitish by external light and for improving the apparent contrast. The video signal level is converted so that the gain of parts of the video signal where the ratio of the self emitting light to external light is small is increased, and the phenomenon where the picture becomes whitish and has less contrast is suppressed to a minimum and further to a process where the apparent contrast is increased. Consequently, even in the case in which external light increases, the contrast does not decrease and the color does not fade.

BRIEF DESCRIPTION OF THE DRAWINGS

FIG. 4 illustrates an input-output characteristic of a brightness level converting means 1 of a contrast processing apparatus in accordance with a first exemplary embodiment of the present invention.

FIG. 5 is a block diagram of a low frequency component attenuating means 3a of a contrast processing apparatus in accordance with a first exemplary embodiment of the present invention.

FIG. 6 illustrates a step input signal.

DETAILED DESCRIPTION OF THE INVENTION

Five exemplary embodiments of a method and an apparatus for contrast processing in accordance with the present invention are explained below. The first exemplary embodiment relates to the case in which external light is not considered and the second to the fifth exemplary embodiments relate to the case in which external light is considered.

FIRST EXEMPLARY EMBODIMENT

Figure 1:
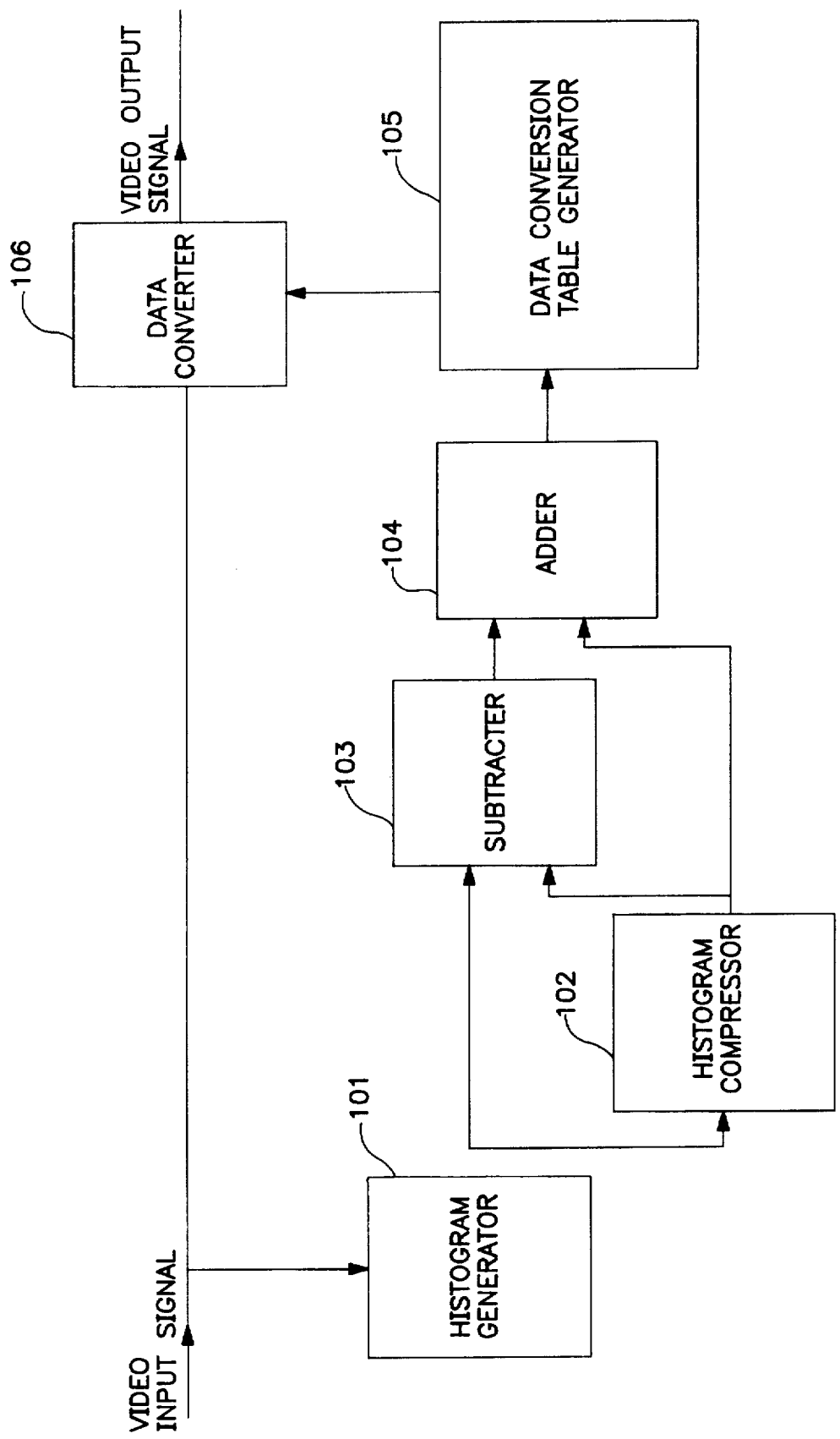
FIG. 1 is a block diagram of a contrast processing apparatus in accordance with the prior art.
Figures 2A, 2B, 2C:
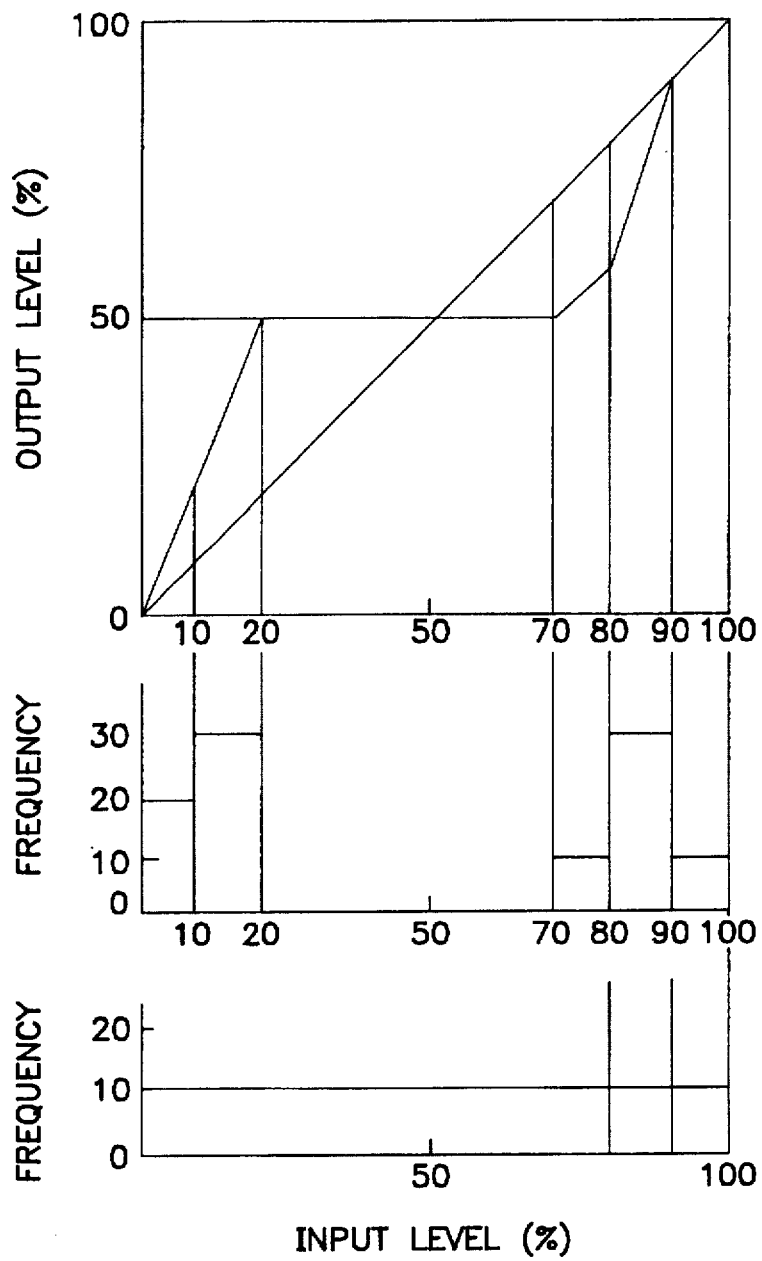
FIGS. 2(a)–(c) are graphs which illustrate the performance of a contrast processing apparatus in accordance with the prior art.
Figure 3:
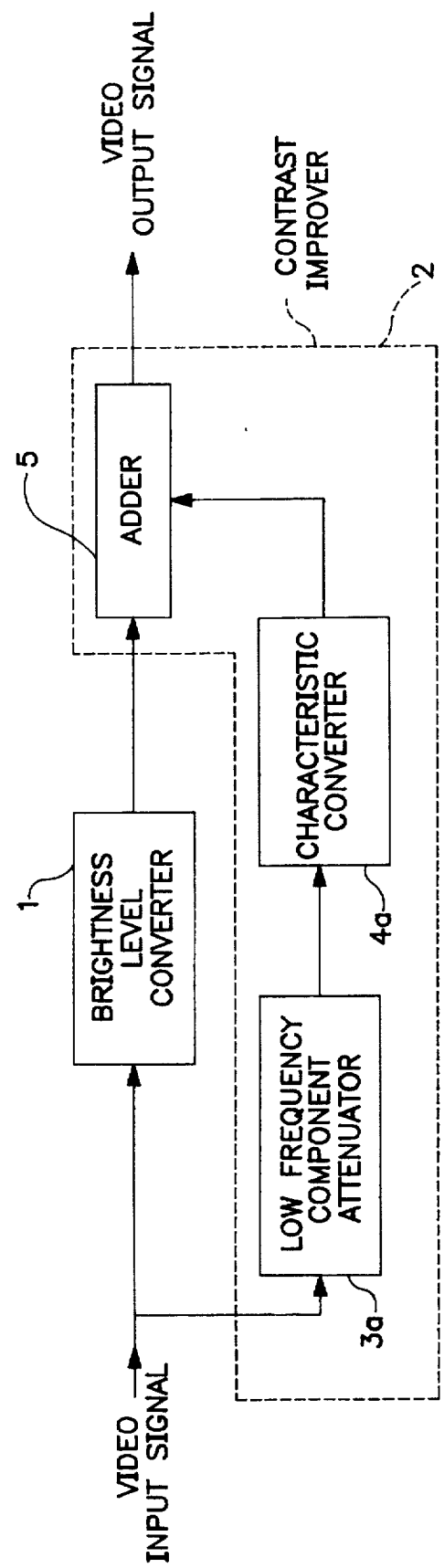
FIG. 3 is a block diagram of a contrast processing apparatus in accordance with a first exemplary embodiment of the present invention.

FIG. 3 is a block diagram of a contrast processing apparatus in accordance with a first exemplary embodiment of the present invention. A brightness level converting means 1 converts the brightness level of the video input signal to a brightness level which can be displayed with a low contrast display device. An example of input-output characteristic of the brightness level converting means 1 is illustrated in FIG. 4.

A contrast improving means 2 includes a low frequency component attenuating means 3a, a characteristic converting means 4a and an adding means 5. The contrast improving means 2 superimposes a waveform, which creates optical illusion of a brightness level, on the video input signal. This improves the picture contrast displayed on a low contrast display device. The low frequency component attenuating means 3a is a type of high pass filter which attenuates low frequency components of the video input signal.

A block diagram of the low frequency component attenuating means 3a is shown in FIG. 5. The low frequency component attenuating means 3a includes a low pass filter 10a and a subtracting means 11a for calculating a difference between the video input signal and the output signal of the low pass filter 10a.

Figure 7:
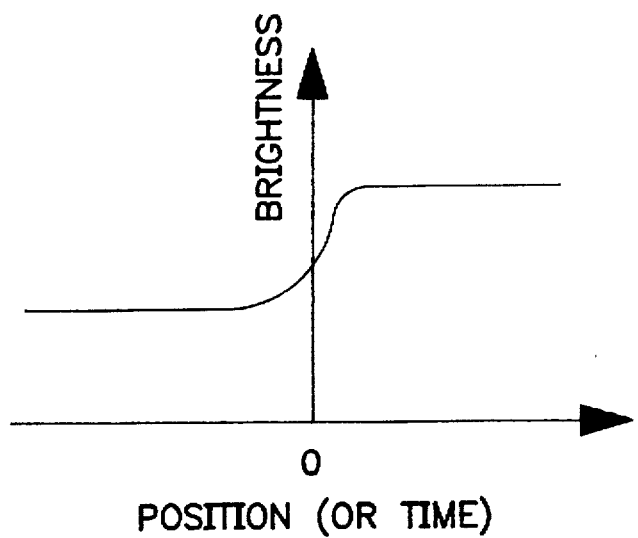
FIG. 7 illustrates a step response of a low pass filter 10a in accordance with an exemplary embodiment of the present invention.
Figure 8:
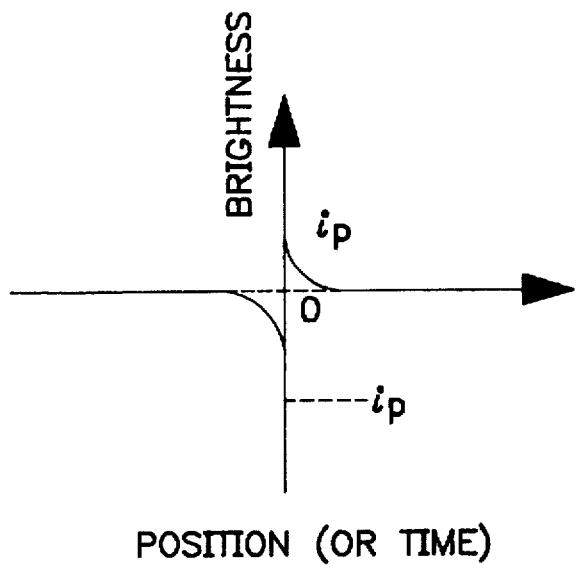
FIG. 8 illustrates a step response of a low frequency component attenuating means 3a in accordance with an exemplary embodiment of the present invention.

Contrast improvement is explained below using a step signal for the video input signal for simplicity. FIG. 6, FIG. 7 and FIG. 8 illustrate a step input signal, a step response of a low pass filter 10a, and a step response of a low frequency component attenuating means 3a, respectively. In FIG. 6, FIG. 7 and FIG. 8, the brightness distribution is expressed as one dimension for simplicity. The abscissa expresses a position on a display device as a video signal is scanned (from left to right and from top to bottom) on a display device. The abscissa can be regarded as a time axis. This is a response characteristic in the case in which the step response of the low pass filter 10a in FIG. 5 is expressed by a Gaussian integral function and is illustrated in FIG. 7. By calculating the difference between the video input signal and the output of the low pass filter 10a at the low frequency component attenuating means 3a shown in FIG. 5, an output signal in which the low frequency components are attenuated from the video input signal shown in FIG. 6 can be obtained. The output signal is shown in FIG. 8.

The output characteristic shown in FIG. 8 of the low frequency component attenuating means 3a is converted at the characteristic converting means 4a and the output of the characteristic converting means 4a is superposed on the output of the brightness level converting means 1 at the adding means 5. The input-output characteristic of the characteristic converting means 4a is determined so that the amount of the optical illusion due to the output of the contrast improving means 2 becomes large as long as a watcher does not feel any disorder when watching the picture which has its contrast reinforced by the contrast improving means 2.

Figure 9:
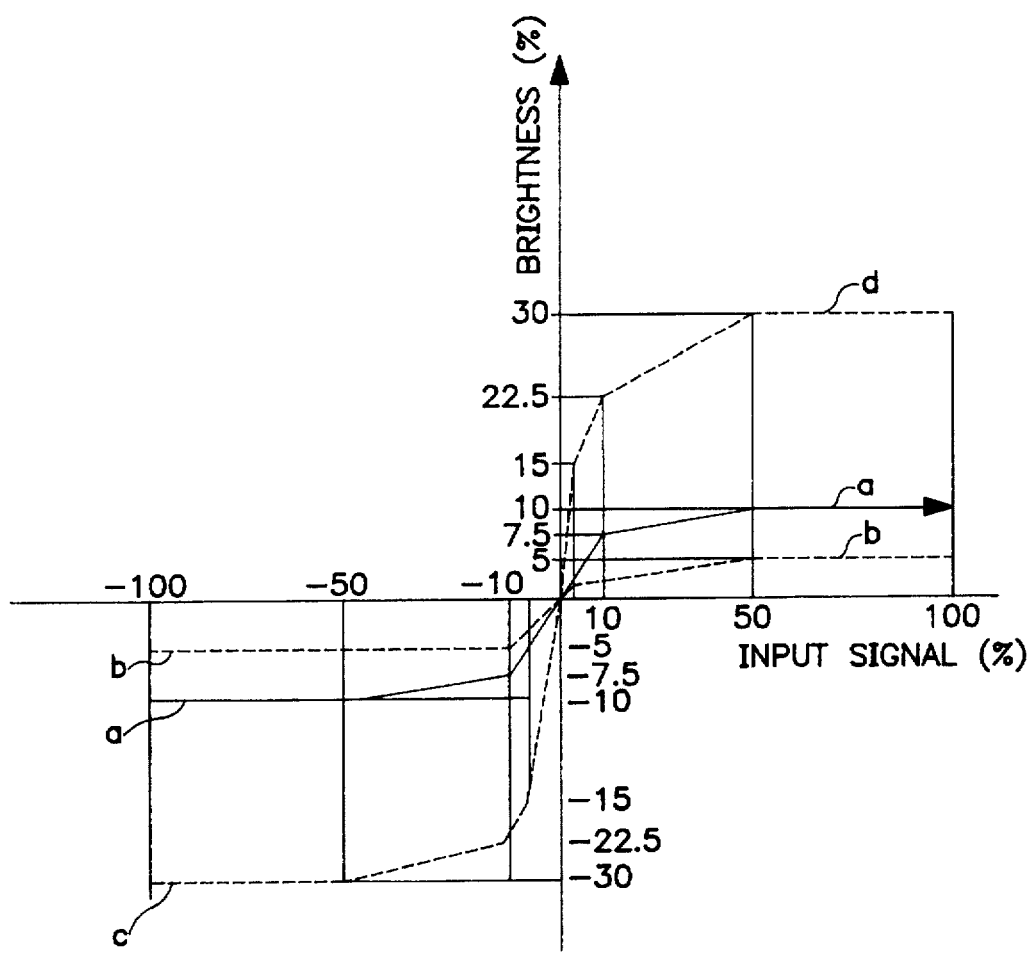
FIG. 9 illustrates an input-output characteristic of a characteristic converting means 4a in accordance with an exemplary embodiment of the present invention.

An example of the input-output characteristic of the characteristic converting means 4a is shown by a solid line a in FIG. 9. In this exemplary embodiment, the output level of the characteristic converting means 4a is converted to the range between +10% and −10% of the video input signal level.

Figure 10:
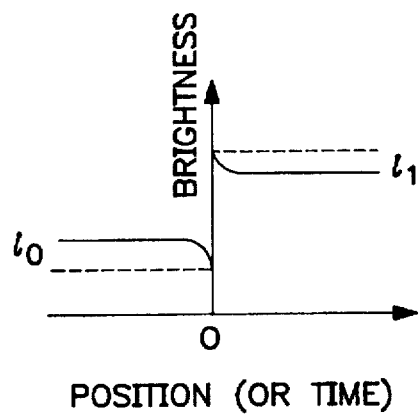
FIG. 10 illustrates a step response of a contrast improving means 2 in accordance with an exemplary embodiment of the present invention.
Figure 11:
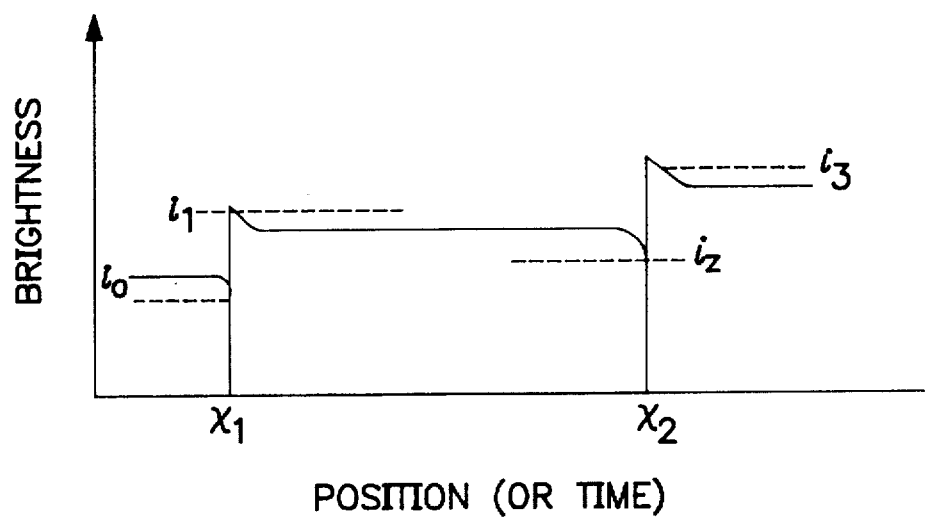
FIG. 11 illustrates how contrast is improved in accordance with an exemplary embodiment of the present invention.

FIG. 10 illustrates a step signal response of the contrast improving means 2 and a brightness variation perceived by observation that are indicated by a solid line and a broken line, respectively. The broken line indicates that the psychological contrast is improved by using the contrast improving means 2. Human eyes are sensitive to a sudden variation of brightness but are insensitive to a gradual variation of brightness. When the brightness varies as shown by the solid line in FIG. 11, the brightness difference $(i_1-i_0)$ is perceived at the position $x_1$, the brightness difference $(i_2-i_1)$ is perceived at the position $x_2$ and the gradual brightness variation from i to $i_2$ between the positions $x_1$ and $x_2$ is not perceived. Therefore, the brightness differences $(i_1-i_0)$ and $(i_3-i_2)$ are perceived on a display device with a brightness range between $i_3$ and $i_0$, although the sum of each brightness difference $\{(i_1-i_0)+(i_3-i_2)\}$ is larger than the brightness difference $(i_3-i_0)$. Thus, the contrast can be improved.

As explained above, according to the first exemplary embodiment, the picture contrast displayed on a low contrast display device can be improved by converting a brightness level of the video input signal to a brightness level which can be displayed on a low contrast display device by superimposing a waveform which creates an optical illusion of a brightness level on the signal with a converted brightness level.

In the case in which no extreme light or dark level exists in the video input signal and the picture, a waveform which creates an optical illusion of a brightness level is superposed on a video input signal which is to be displayed on a low contrast display device. As a result, a conversion by a brightness level converting means can be omitted. Besides, a similar effect as that obtained using a low pass filter having step response expressed by a Gaussian integral function can be obtained by using a low pass filter having a step response expressed by a second degree function or a third degree function.

SECOND EXEMPLARY EMBODIMENT

The circuit configuration of the second exemplary embodiment is similar to that of the first exemplary embodiment except for the brightness level converting means 1, therefore, the brightness level converting means is explained below.

Figure 12:
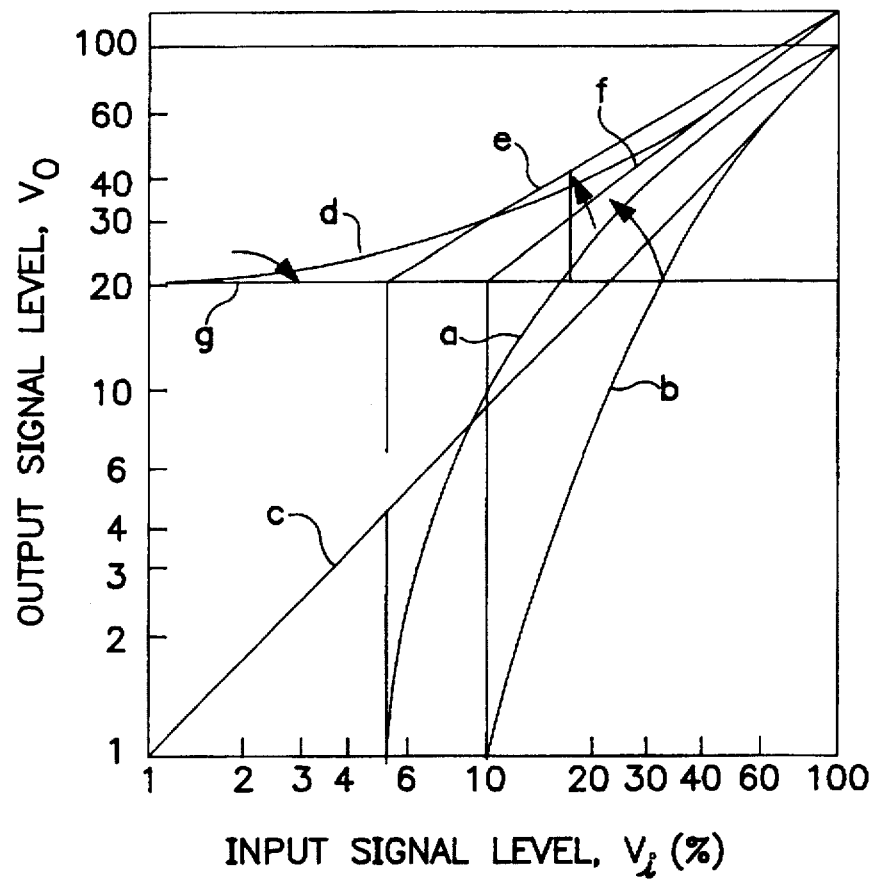
FIG. 12 illustrates a performance example of a brightness level converting means of a contrast processing apparatus in accordance with a second exemplary embodiment of the present invention.

The video signal level is converted at the brightness level converting means 1 so that the signal gain for a part of the video signal level having a low ratio of self emitting light to external light. That is, a part of the video signal having a low level is increased when a picture is displayed on a display device. In FIG. 12, the abscissa is a video input signal level and the ordinate is a converted signal level, which corresponds to light (brightness) emitted from the display device. Both the abscissa and the ordinate are scaled logarithmically.

The relation between an input and an output is expressed by a straight line c in the case of no external light and no particular process. If the external light is 20% of the maximum brightness of the display device, the external light is expressed by a horizontal line g. Here, external light means the reflected light at the surface of the display device with the amount of all the light being converted to and indicated by a signal level.

As the output light from the display device is a sum of the emitted light of the display device and the reflected light of the external light, the relation between an input and an output is expressed by a curve d when external light exists. It is understood from the curve d that if the input signal level is low, the ratio of the external light to the output light from the display device increases and as a result the picture gets faint and hard to watch. In the exemplary embodiment, the video input signal is converted to a curve a or a curve b as shown in FIG. 12 to prevent the picture from getting faint. The curves e and f correspond to the curves a and b, respectively and to input/output characteristics including reflected external light at the display device. As the curves e and f are linear on logarithmic scales, the varying rate of the output is the same as that of the input. In fact, the conversion characteristics a and b are designed so that the curves e and f are linear on logarithmic scales.

The characteristic is, for example, that the output including external light varies 6% when the input varies 10% at the 90% input level and the output including external light varies the same 6% when the input varies 10% even at the 20% input level. The curve e in FIG. 12 shows a characteristic that satisfies the above-mentioned condition in the range of 5 to 100% input level. The conversion characteristic to satisfy this characteristic is the curve a. The curve f shows a characteristic that satisfies the above-mentioned condition in the range of 10 to 100% input level. The corresponding conversion characteristic is the curve b.

The conversion characteristic is expressed by Eq. 1.

$$Vo=p*(Vi)^r-q \tag{Eq. 1}$$

Vo is output level, Vi is input level, and p, q and r are constants, where p, q and r and are expressed by Eq. 2.

$$p=1+q$$
$$0.7>q>0 \tag{Eq. 2}$$
$$1.0>r>0.2$$

The relation expressed by Eq. 2 is merely a rough standard.

For the curve a in FIG. 12, p=1.2, q=0.2 and r=0.59 and for the curve b, p=1.2, q=0.2 and r=0.77. As explained above, the parts in which the ratio of self emitting light to external light are low are mainly compensated for in the brightness level converting means 1. The parts in which the ratio are high are also compensated. The parts faded by external light are first compensated and a uniform contrast is obtained at every brightness level even though external light is present.

After processing against external light at the brightness level converting means 1, a waveform which creates an optical illusion of brightness level is superimposed on the video input signal by the same process as that of the first exemplary embodiment and the apparent (subjective) contrast is improved. By executing the above two processes, the contrast decreases by caused external light and the contrast decreases at all brightness levels of the picture are mitigated.

Therefore, the picture contrast displayed on a display device can be improved even when the contrast is significantly decreased by external light.

As explained above, in the second exemplary embodiment of the present invention, the picture which gets whitish and has its contrast decreased due to external light is compensated. As a result, the apparent (psychological) contrast of the compensated picture is improved, and a satisfactory contrast which is almost the same as that obtained, when no external light exists is perceived even though external light exists. As a result, a picture which is easy to watch can be presented.

The second exemplary embodiment is superior than the first exemplary embodiment in improving apparent contrast.

THIRD EXEMPLARY EMBODIMENT

Figure 13:
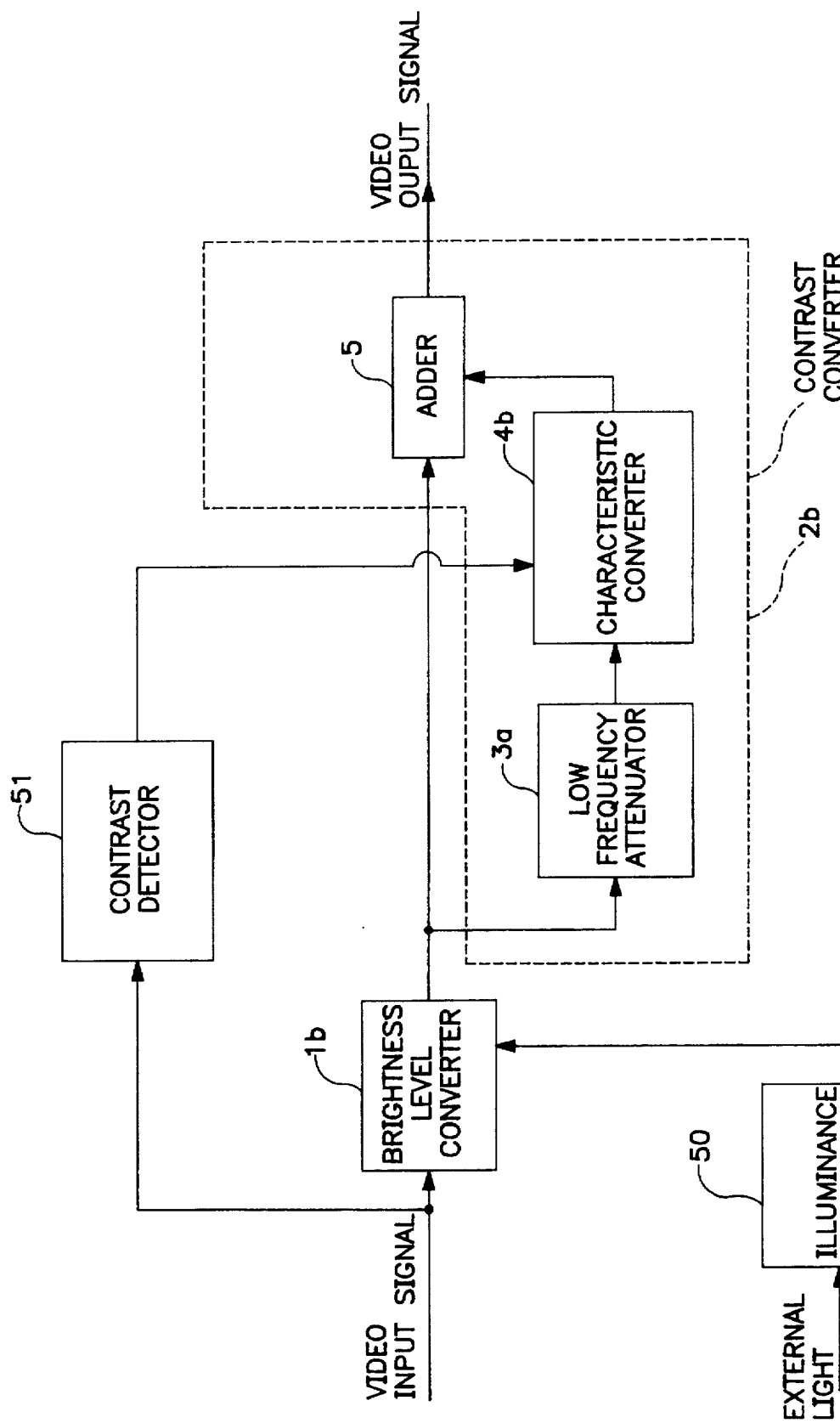
FIG. 13 is a block diagram of a contrast processing apparatus in accordance with a third exemplary embodiment of the present invention.

FIG. 13 is a block diagram of a contrast processing apparatus in accordance with a third exemplary embodiment of the present invention. The blocks which are similar those in the first exemplary embodiment (shown in FIG. 3) are numbered identically. The different blocks are an illuminance measuring means 50, a brightness level converting means 1b, a contrast detecting means 51, and a characteristic converting means 4b. A contrast converting means 2b is almost the same as the contrast converting means 2 of the first exemplary embodiment. FIG. 3, except that the characteristic converting means 4b is different.

The illuminance measuring means 50 measures an external light level coming to the display device. The brightness level converting means 1b converts the input signal level varying the conversion characteristic expressed by Eq. 1 according to the external light value measured by the illuminance measuring means 50. The conversion characteristic is varied by controlling the values of the constants p, q and r in Eq. 1. In the brightness level converting means 1b, the constant q is set to nearly zero where there is no external light and is increased according to the increase of the external light level. The constant r is set to nearly 1 when there is no external light and is decreased according to the increase of the external light level. The constants q and r are controlled nearly in the range given in Eq. 2.

The contrast detecting means 51 detects the contrast $C_o$ (expressed by percent ratio) and the average level $i_{av}$ (expressed by percent ratio to the peak level) of the signal, discriminates which is larger, outputs the larger value to the characteristic converting means 4b, and controls the conversion characteristic of the characteristic converting means 4b. The average level of the signal $i_{av}$ is expressed by Eq. 3 and is illustrated in FIG. 6. $i_{av}$ is obtained by passing through a low pass filter with a low cutoff frequency.

$$i_{av}=(i_0+i_1)/2 \quad \text{(Eq. 3)}$$

The contrast Co is calculated by Eq. 4 from $i_0$ and $i_1$ in FIG. 6.

$$Co=(i_1-i_0)/i_{av} \quad \text{(Eq. 4)}$$

Figure 14:
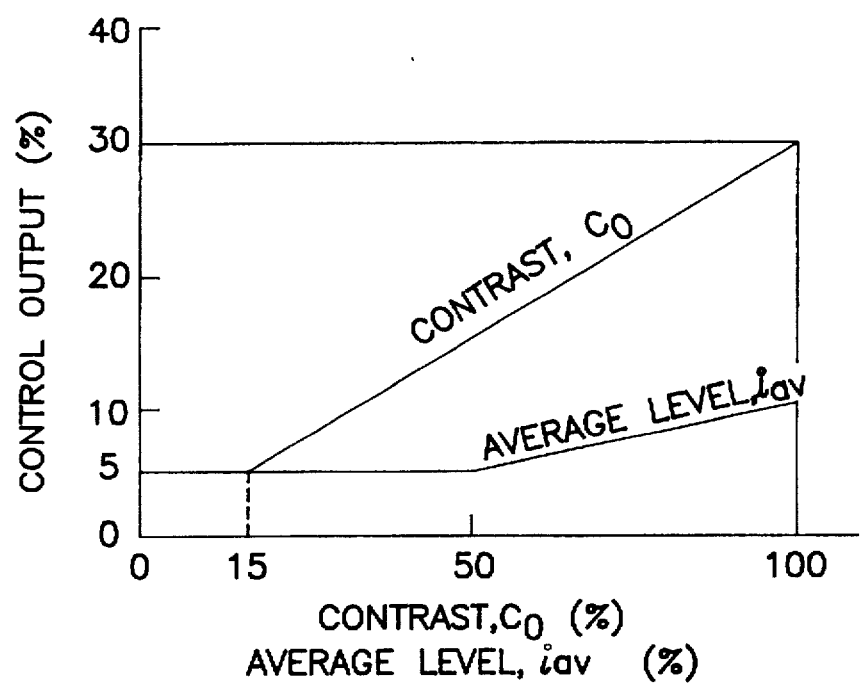
FIG. 14 illustrates a performance example of a characteristic converting means 4b of a contrast processing apparatus in accordance with a third exemplary embodiment of the present invention.

Examples of the contrast Co and the average level $i_{av}$ of the signal are shown in FIG. 14. The characteristic converting means 4b controls the characteristic to vary the ordinate of the clipping characteristic in FIG. 9 with the control value, which is the larger one of contrast Co or average level $i_{av}$. In the case in which the contrast Co at the contrast detecting means 51 is 15%, for example, the control value is 5%, as shown in FIG. 14, and the input-output characteristic of the characteristic converting means 4b is the maximum value of the ordinate, 5%, and is shown by a broken curve b in FIG. 9. In the case in which the contrast Co at the contrast detecting means 51 is 100%, the control value is 30%, FIG. 14, and the input-output characteristic of the characteristic converting means 4b is the maximum value of the ordinate, 30%, and is shown by a broken curve c in FIG. 9.

When the picture is light or has high contrast, the picture is not perceived as unnatural even though the amplitude of the waveform which reinforces the picture contrast is at 20 to 30%. In fact, when the picture is dark or has low contrast, the picture is sometimes perceived as unnatural, unless the amplitude of the waveform which reinforces the picture contrast is added according to the external light condition.

Thus, the external light which is measured by the illuminance measuring means 50 and the brightness level conversion characteristic is controlled by the brightness level converting means 1b according to the measured external light level By using this control, even when the external light level varies, the picture can be uniformly reproduced without fading in the range from the light part to the predetermined dark part.

Besides, as the contrast and the average level of the picture signal are detected at the contrast detecting means 51, a process to improve the apparent (psychological) contrast is performed so that the perceived picture appears natural according to the conditions of the picture. Thus, the apparent contrast can be improved.

Thus, in the third exemplary embodiment, contrast processing is performed at an appropriate level according to the intensity of the external light and the contrast or the brightness of the picture. As a result, satisfactory contrast is perceived while watching a picture under any condition. Also, a contrast processing apparatus can be realized which displays a picture easy to watch.

The third exemplary embodiment is superior to the second exemplary embodiment in improving apparent contrast.

FOURTH EXEMPLARY EMBODIMENT

Figure 15:
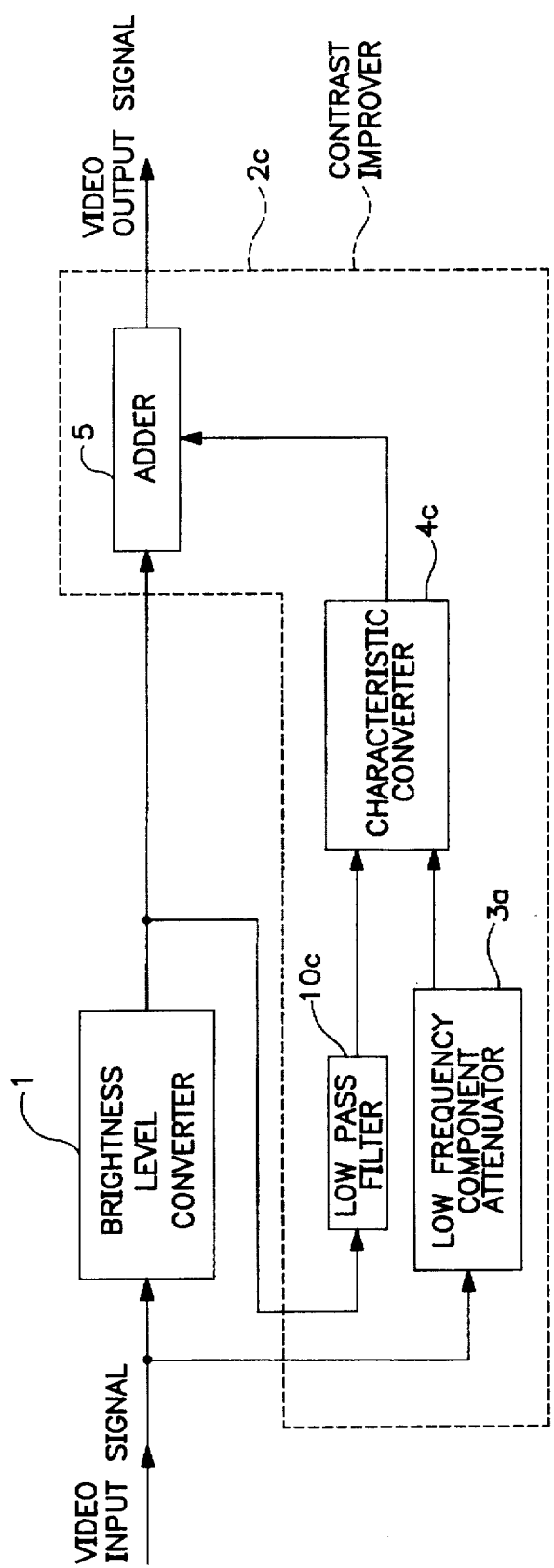
FIG. 15 is a block diagram of a contrast processing apparatus in accordance with a fourth exemplary embodiment of the present invention.

FIG. 15 shows a block diagram of a contrast processing apparatus in accordance with a fourth exemplary embodiment of the present invention. The blocks excluding a low pass filter 10c and a characteristic converting means 4c are the same as those in the first exemplary embodiment, FIG. 3, and are numbered with the same numbers and their explanations are omitted.

The low pass filter 10c smooths the output of the brightness level converting means 1. The characteristic converting means 4c converts the output of a low frequency component attenuating means 3a and an adding means 5 superposes the output of the characteristic converting means 4c on the output of the brightness level converting means 1. The characteristic conversion by the characteristic converting means 4c is performed considering the average brightness of the step input signal.

Figure 16:
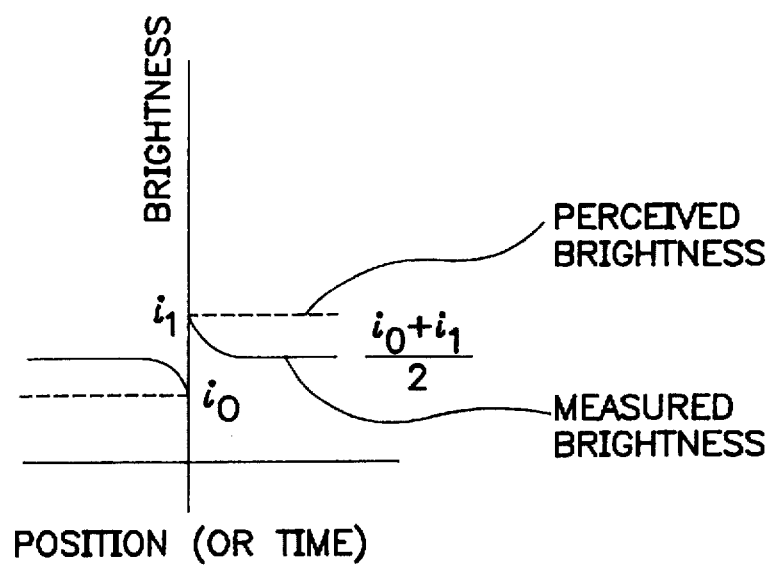
FIG. 16 illustrates an offset waveform of a step response of a low frequency component attenuating means 3a of a contrast processing apparatus in accordance with a fourth exemplary embodiment of the present invention.

FIG. 16 illustrates an offset waveform for a step response of the low frequency component attenuating means 3a and a brightness waveform perceived for the offset waveform. The solid line indicates waveform which offsets a step response, FIG. 8, of the low frequency component attenuating means 3a with the average brightness $i_{av}=(i_0+i_1)/2$ of the step input signal.

An optical illusion resulting from this waveform is explained in the following.

The contrast (ratio) Cl of the peak value ip of the step response (FIG. 8) to the average brightness $i_{av}$ of the step input signal (FIG. 6) is defined as follows:

$$C_1=ip/i_{av}=2*i_p/(i_0+i_1) \quad \text{(Eq. 5)}$$

When the contrast Cl is low (smaller than 25 to 30%), the perceived picture gives less feeling of disorder. The picture includes 10 to 20% illusion against real brightness which is perceived as a brightness distribution indicated by a broken line in FIG. 16. When the contrast is high (much higher than 30%), however, the brightness variation near the edge is perceived and the watched picture gives a feeling of disorder. Therefore, when the contrast of the picture is reinforced by the contrast improving means 2c, the input-output characteristic of the characteristic converting means 4c is designed so that the amount of optical illusion due to the output of the contrast improving means 2c becomes large as long as the watcher does not feel any disorder. The output of the low pass filter 10c corresponds to the denominator $(i_0+i_1)/2$ of Eq. 5. The characteristic converting means 4c converts the output signal of the low frequency component attenuating means 3a according to the output of the low pass filter 10c which receives the output of the brightness level converting means 1.

Figure 17:
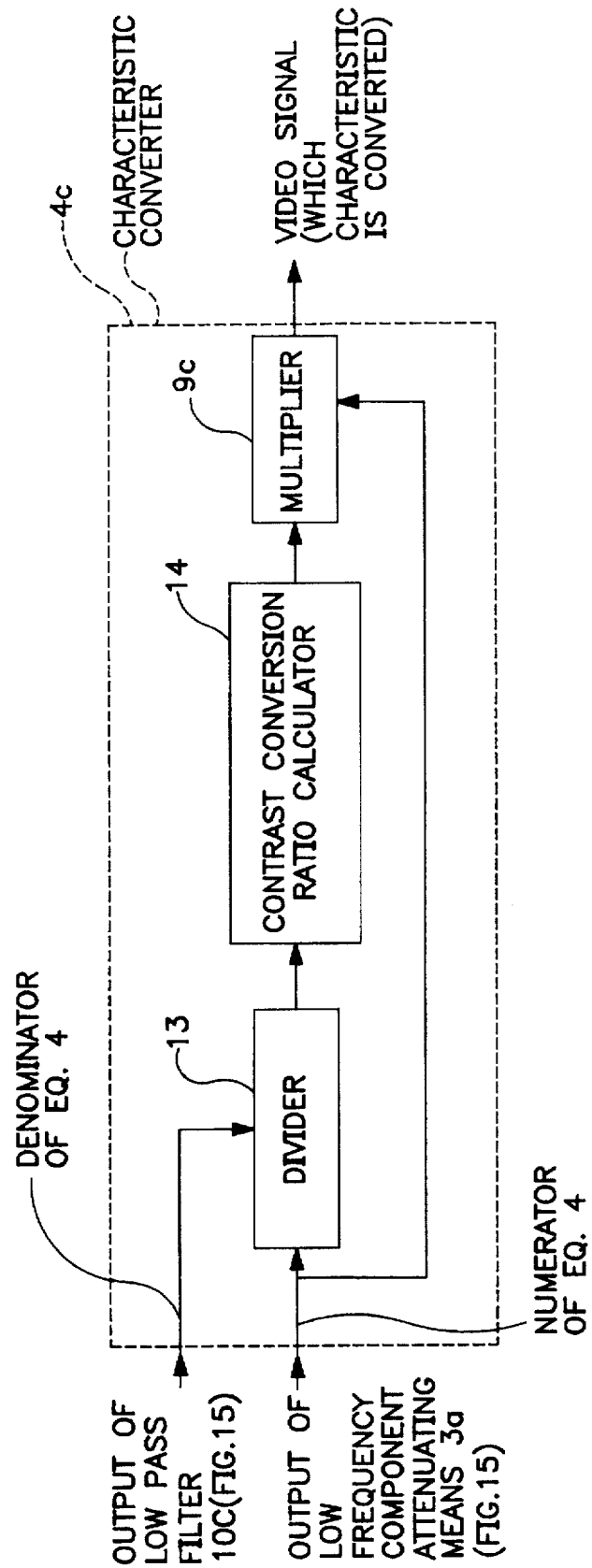
FIG. 17 is a block diagram of a characteristic converting means 4c of a contrast processing apparatus in accordance with a fourth exemplary embodiment of the present invention.

An example of a block diagram of the characteristic converting means 4c is shown in FIG. 17. The characteristic converting means 4c comprises a dividing means 13, a contrast conversion ratio calculating means 14 and a multiplying means 9c.

The dividing means 13 divides the output of the low frequency component attenuating means 3a by the output of the low pass filter 10c and calculates the contrast value expressed by Eq. 5.

The maximum value of the numerator ip of Eq. 5, i.e. the peak value of the output of the low frequency component attenuating means 3a, becomes half of the step input signal variation (FIG. 6), i.e. $(i_1-i_0)/2$. The peak value ip of the step response decreases smoothly from near the peak value to zero.

The contrast conversion ratio calculating means 14 calculates a conversion rate by multiplying the output of the low frequency component attenuating means 3a so that the contrast (ratio) of the output of the characteristic converting means 4c derived from the output of the low pass filter 10c, becomes smaller than 30%.

Figure 18:
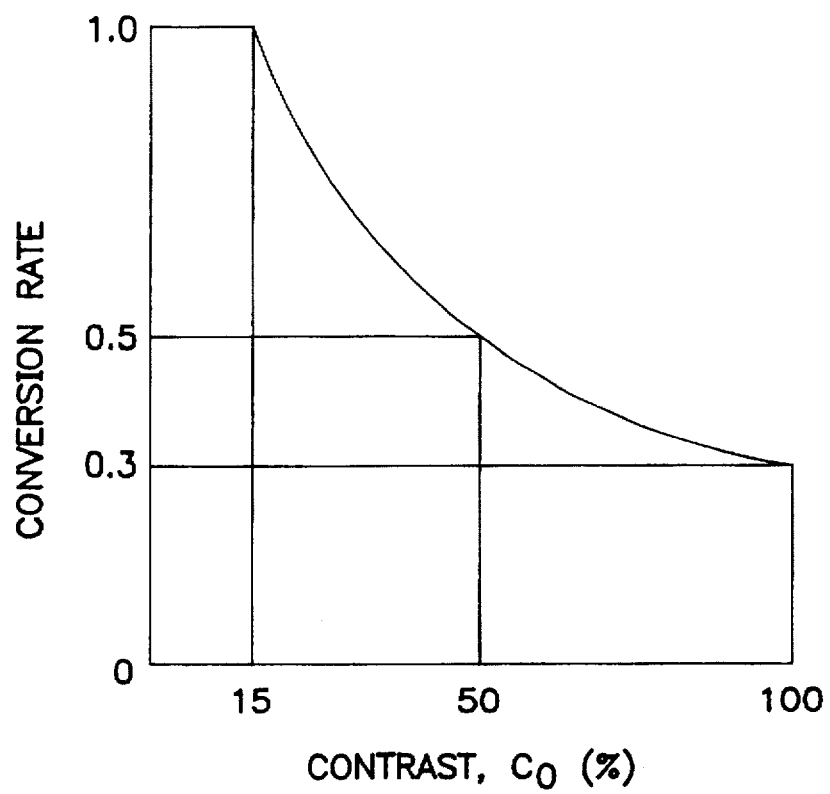
FIG. 18 illustrates an input-output characteristic of a contrast conversion rate calculating means 14 of a contrast processing apparatus in accordance with a fourth exemplary embodiment of the present invention.

An example of input-output characteristics of the contrast conversion ratio calculating means 14 is illustrated in FIG. 18. The abscissa and the ordinate indicate an input and an output of the contrast conversion rate calculating means 14, respectively. The contrast conversion ratio calculating means 14 is designed so that there is no conversion when the contrast is low (under 15%). However, the conversion rate does decrease according to an increase of contrast and the conversion rate becomes 0.3 when the contrast is 100%. The multiplying means 9c multiplies the contrast value converted at the contrast conversion ratio calculating means 14 by the output of the low frequency component attenuating means 3a and outputs a waveform to be superposed for improving the contrast.

Figure 19:
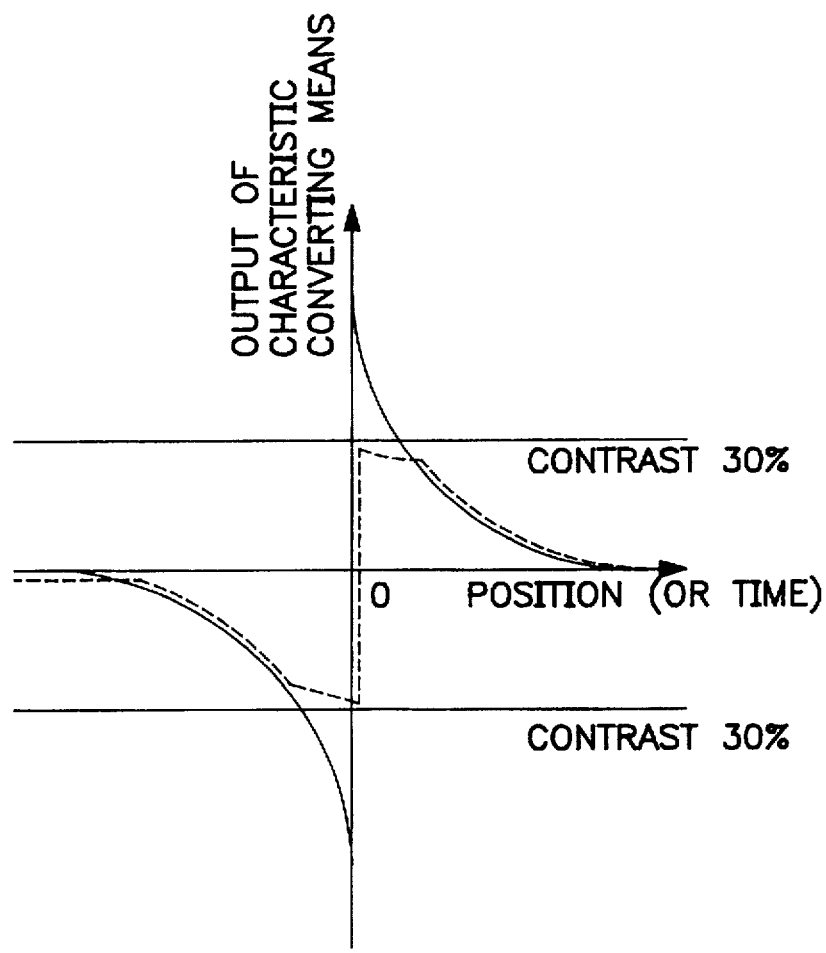
FIG. 19 illustrates a conversion example of a characteristic converting means 4c of a contrast processing apparatus in accordance with a fourth exemplary embodiment of the present invention.

An example of output waveforms is illustrated in FIG. 19. In FIG. 19, the solid line indicates the output of the low frequency component attenuating means 3a, i.e. the input of the characteristic converting means 4c and the broken line indicates the output of the characteristic converting means 4c. The input is converted so that the contrast (ratio) of the output of the characteristic converting means 4c to the output of the low pass filter 10c becomes smaller than 30%. In FIG. 19, the level at which the contrast is 30% varies according to the output of the low pass filter 10c.

Figure 20:
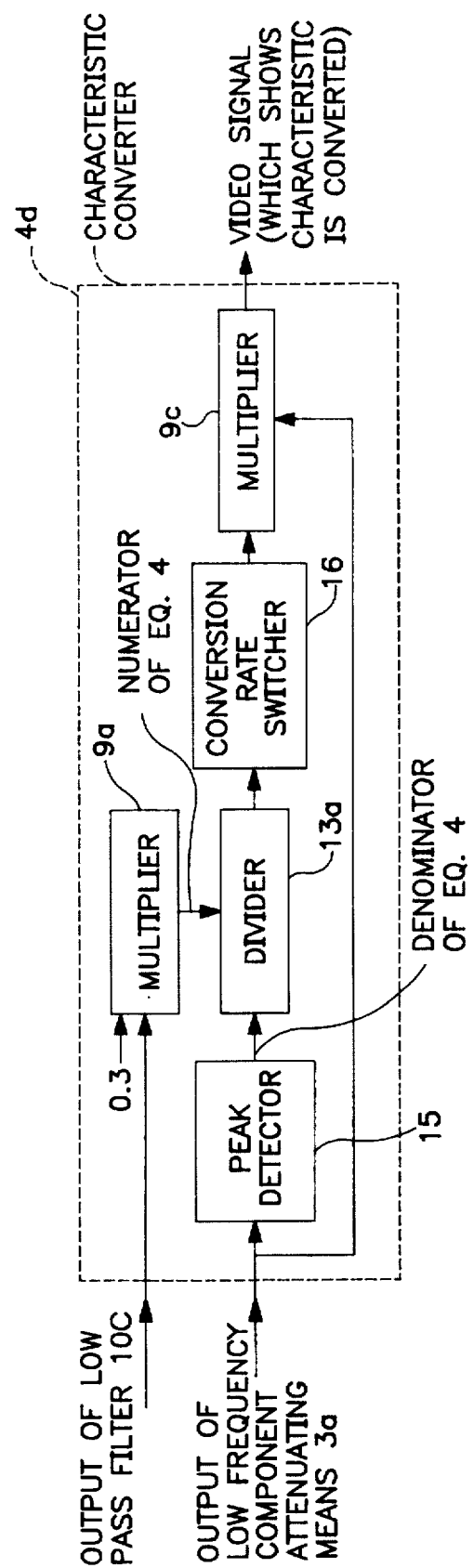
FIG. 20 is a block diagram of a characteristic converting means 4d of a contrast processing apparatus in accordance with a fourth exemplary embodiment of the present invention.

An example of a block diagram of the characteristic converting means 4c is shown in FIG. 20. The characteristic converting means 4c comprises a multiplying means 9a, a peak detecting means 15, a dividing means 13a, a conversion rate switching means 16 and a multiplying means 9c. The multiplying means 9a is designed so that the upper limit of the output becomes 0.3 by multiplying the output of the low pass filter 10c by 0.3. The peak detecting means 15 detects the peak value (the maximum absolute value) near the watched picture element of the output of the low frequency component attenuating means 3a and outputs the peak value. The dividing means 13a divides the output of the multiplying means 9a by the output of the peak detecting means 15 and calculates the conversion rate for making the contrast value Cl expressed by Eq. 5 under 30%.

The conversion rate switching means 16 is a clipping means which outputs 1 when the output of the dividing means 13a is over 1 and outputs the output of the dividing means 13a when the output of the dividing means 13a is under 1. The multiplying means 9a multiplies the conversion rate determined by the conversion rate switching means 16 by the output of the low frequency component attenuating means 3a and outputs a waveform for superposing to improve contrast.

In the characteristic converting means 4d shown in FIG. 20, as the peak value near the watched picture element of the output of the low frequency component attenuating means 3a is detected at the peak detecting means 15, the conversion rate is determined according to the peak value. The conversion rate does not depend on the position of the watched picture element as shown in FIG. 19. The conversion is made uniformly near the peak value without distorting the output of the low frequency component attenuating means 3a. Thus, a waveform which is suitable to improve apparent contrast is synthesized and subjective contrast is improved.

In the fourth exemplary embodiment, the brightness level of the video input signal is converted to a brightness level which can be displayed with a low contrast display device and a waveform which creates an optical illusion of brightness level is superposed on the converted brightness level according to the brightness of the picture. The improved contrast is displayed on a low contrast display device. In addition, by determining the output of the contrast improving means 2c according to the brightness level of the video input, the contrast is more improved than that of the first exemplary embodiment without causing disorder to be perceived.

Although the input of the low pass filter 10c is supplied from the output of the brightness level converting means 1 in FIG. 15, the same effect is obtained even if the video input signal is supplied directly to the input of the low pass filter 10c. Although in this exemplary embodiment the performance is explained using a low pass filter in which the step response is a Gaussian integral function, the same effect is obtained even if a low pass filter used has a step response expressed by a second degree function or a third degree function. Other characteristic converting means can be used instead of the characteristic converting means 4c described here.

FIFTH EXEMPLARY EMBODIMENT

Figure 21:
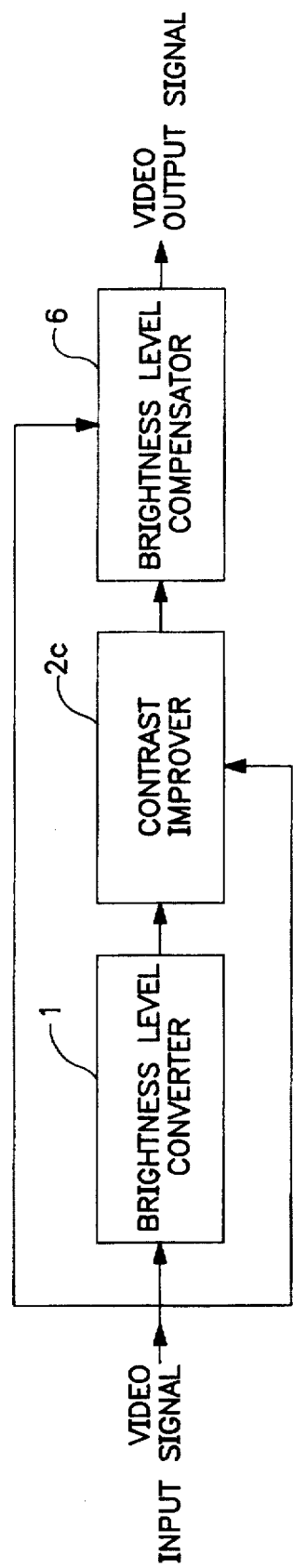
FIG. 21 is a block diagram of a contrast processing apparatus in accordance with a fifth exemplary embodiment of the present invention.

FIG. 21 shows a block diagram of a contrast processing apparatus in accordance with a fifth exemplary embodiment of the present invention. The blocks excluding a brightness level compensating means 6 are the same as those in the fourth exemplary embodiment, as shown in FIG. 15 or the first exemplary embodiment, as shown in FIG. 3, and are numbered with the same numbers and their explanations are omitted.

Figure 22:
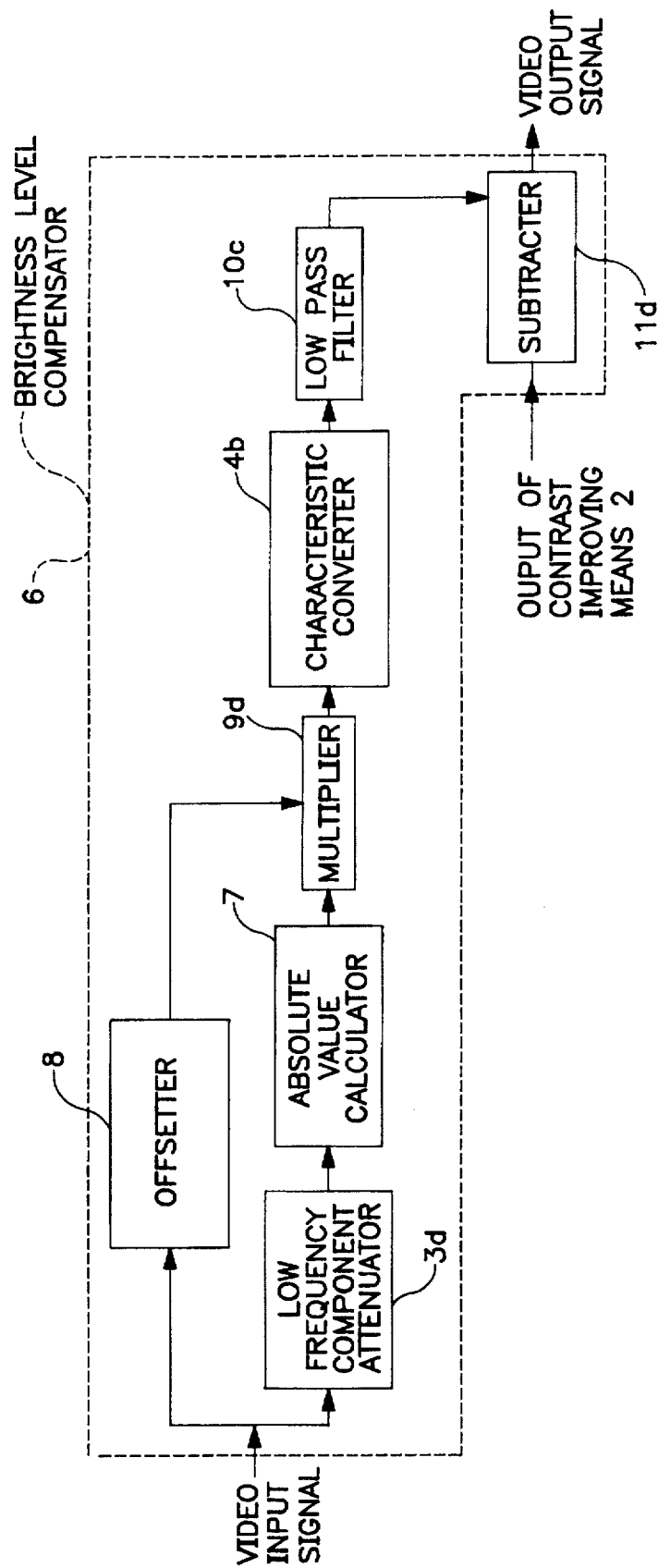
FIG. 22 is a block diagram of a brightness level compensating means 6 of a contrast processing apparatus in accordance with a fifth exemplary embodiment of the present invention.

FIG. 22 shows a block diagram of a brightness level compensating means 6. The brightness level compensating means 6 includes an offsetting means 8, a low frequency component attenuating means 3d, an absolute value calculating means 7, a multiplying means 9d, a characteristic converting means 4b, a low pass filter 10c and a subtracting means 11d.

The low frequency component attenuating means 3d attenuates low frequency components of the video input signal. A block diagram of the low frequency component attenuating means 3d is the same as that of the low frequency component attenuating means 3a. The absolute value calculating means 7 calculates an absolute value of the output of the low frequency component attenuating means 3d. The offsetting means 8 offsets the brightness level of each picture element of the video input signal by about a half of the number of graduations towards minus direction. The multiplying means 9d multiplies the output of the absolute value calculating means 7 by the output of the offsetting means 8 for every picture element. As a result, the output level of the multiplying means 9d becomes large at a point where the brightness varies and is a difference compared with the brightness corresponding to a half of the number of graduations (nearly a half brightness of the maximum), i.e. at a lighter or darker point.

The characteristic converting means 4b converts the output characteristic of the multiplying means 9d.

Figure 23:
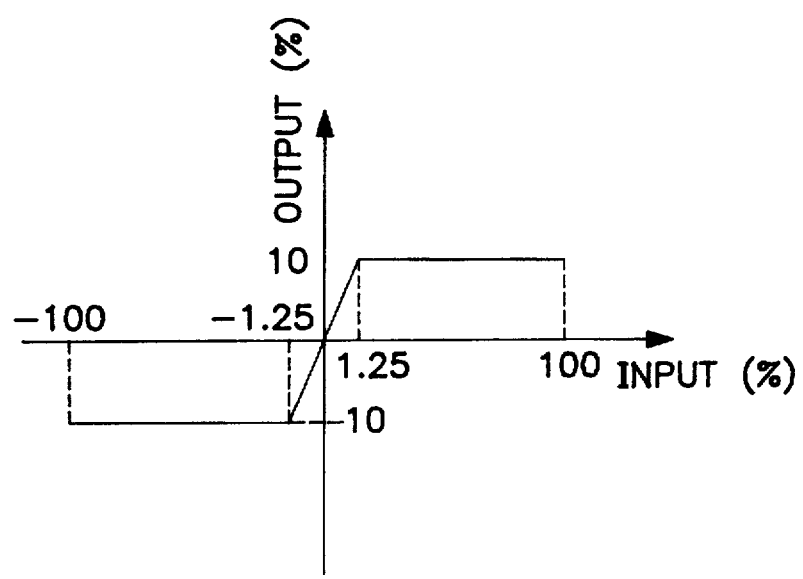
FIG. 23 illustrates an input-output characteristic of a characteristic converting means 4b of a contrast processing apparatus in accordance with a fifth exemplary embodiment of the present invention.

An input-output characteristic of the characteristic converting means 4b is shown in FIG. 23. The input-output characteristic of the characteristic converting means 4b is designed so that the output level range is a level corresponding to nearly +/−10% of the number of graduations, so that one watching the picture will not perceive disorder due to the brightness level compensation. The gradient near the zero input level determines the gain of the offsetting means 8. FIG. 23 shows an example of the gain 8.

The low pass filter 10c makes the output of the characteristic converting means 4b smooth. The subtracting means 11d inverts the output polarity of the low pass filter 10c and superposes it on the output of the contrast improving means 2.

Thus, the brightness level compensating means 6 compensates a point where the brightness varies and where the point is light to become darker. The brightness level compensating means also compensates a point where the brightness varies and where the point is dark to become lighter. In other words, by bringing the part of signal level not at the center value of the video signal closer to the center value, the probability that the picture will contain parts that the display device may have difficulty displaying can be reduced.

As a result, a light or a dark point where the brightness varies can be displayed at a brightness level which the display device has a high display ability which improves the perceived impression of the displayed picture.

Although in the fifth exemplary embodiment the performance is explained using a low pass filter having a step response is a Gaussian integral function, the same effect is obtained even if a low pass filter is used having a step response expressed by a second degree function or a third degree function. The same effect is obtained even if other means are used as a means for detecting a light part or a dark part and a brightness variation in the picture. In the fifth exemplary embodiment, the brightness level of the video input signal is converted to a brightness level which can be displayed with a low contrast display device. A waveform creates an optical illusion of a brightness level when superimposed on the video input signal, thus, improved contrast can be displayed on a low contrast display device. In addition, by compensating the brightness of a light point having a brightness variation, and by compensating the brightness of a dark point having a brightness variation, a light or a dark point where the brightness varies can be displayed at a brightness level at which the display device has high display ability.

Although a video input signal is used as an input signal of the brightness level compensating means 6 in the exemplary embodiment, an output of the brightness level converting means 1 can be used instead.

Although an example in which a brightness level compensating means 6 is added behind the fourth exemplary embodiment, as shown in FIG. 15, is described, as shown in FIG. 21, it is natural that the brightness level compensating means 6 may be added behind the first, the second, or the third exemplary embodiment.

It is unnecessary to provide two controls at the same time. A control of the brightness level converting means 1b according to external light or a control of the characteristic converting means 4b by the contrast converting means 51 is adequate.

The characteristic of a brightness level converting means 1 or 1b is not restricted to Eq. 1 and Eq. 2. The characteristics of the brightness level converting means can be an approximation or a variation of Eq. 1 and Eq. 2.

The characteristics shown in FIG. 9, FIG. 12 and FIG. 14 are only examples and should not be seen as a restriction on these characteristics.

Although the exemplary embodiments of the present invention are shown here in forms of apparatus, it is apparent that they can be realized as software to process with a computer.

As explained above, the present invention converts a brightness level of a picture to a brightness level which can be displayed with a low contrast display device. A waveform creates an optical illusion of a brightness level when superimposed on the video input signal, and by compensating the brightness of a light point having brightness variation to decrease, and by compensating the brightness of a dark point having brightness variation to increase, the contrast of the picture displayed on a low contrast display device can be improved.

In the present invention, a phenomenon where the picture gets whitish and its contrast decreases which is caused by external light is compensated. The apparent (psychological) contrast of the compensated picture is improved when the picture is watched under no external light and even when the picture gets whitish and the contrast decreases as a result of external light. Processing is performed according to external light and the contrast and the brightness of the video signal.

By contrast processing a part of the signal level at which a variation exists in the video signal and which is apart from the center value of the video signal, the probability that the display will have to display a part of the video signal, which is outside the ability of the display device to display satisfactorily, is reduced.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A method for contrast processing a video input signal for display on a display device, said video input signal having a plurality of signal amplitude varying components including low frequency components and high frequency components higher in frequency than said low frequency components, said method comprising the steps of:

extracting said high frequency components from said video input signal;

compressing said high frequency components between a predetermined range of said signal amplitude varying components to generate compressed signal amplitude varying components; and superimposing said compressed signal amplitude varying components on said video input signal to alter the contrast of said video input signal creating an optical illusion when said video input signal is displayed on the display device.

2. A method for contrast processing a video input signal for display on a contrast display device, said video input signal having a plurality of signal amplitude varying components including low frequency components and high frequency components higher in frequency than said low frequency components, said method comprising the steps of:

compressing a brightness level of said video input signal;

extracting said high frequency components from said video input signal;

compressing said high frequency components between a predetermined range of said signal amplitude varying components to generate compressed signal amplitude varying components; and superimposing said compressed signal amplitude varying components on said compressed video input signal to convert the contrast of said video input signal creating an optical illusion which can be displayed on the contrast display device.

3. A method for contrast processing a video input signal having a self-emitting light level, a signal gain for display on a contrast display device, and a plurality of signal amplitude varying components including low frequency components and high frequency components higher in frequency than said low frequency components, said method comprising the steps of:

receiving the video input signal;

increasing the signal gain of the video input signal to produce a level converted video signal when a ratio of the level of self emitting light to external light level decreases;

extracting said high frequency components from the video input signal;

compressing selective ones of said high frequency components; and superimposing said compressed signal amplitude varying components on said level converted video signal to alter the apparent contrast of said level converted video signal creating an optical illusion when said video signal is displayed on the contrast display device.

4. A method for contrast processing the video input signal as recited in claim 3, wherein the signal gain of the video input signal is variable increased according to the amount of external light.

5. A method for contrast processing the video input signal as recited in claim 3 further comprising the steps of:

detecting the brightness level and a distribution of brightness variation of the video input signal, determining from said detected brightness level whether portions of the video signal have one of a brightness level above a predetermined value and a brightness level below the predetermined value;

compensating the brightness varying portions of the video input signal having the brightness level above the predetermined value to a lower brightness level; and compensating the brightness varying portions of the video input signal having the brightness level below the predetermined value to a higher brightness level;

wherein the brightness level of the brightness varying portions of the video input signal having one of the brightness level below the predetermined value and the brightness level above the predetermined value are compensated so that the brightness varying portions can be displayed on a display device.

6. A method for contrast processing as recited in claim 3, wherein the video input signal and the level converted video signal each have a contrast value and wherein the step for compressing the signal amplitude varying components includes variably compressing the high frequency components in response to said contrast value of one of the video input signal and level converted video signal.

7. A method for contrast processing as recited in claim 5, wherein the video input signal and the level converted video signal each have a contrast value and wherein the step for compressing the high frequency components includes variably compressing the high frequency components having an amplitude between a predetermined range in response to said contrast value of one of the video input signal and level converted video signal.

8. A method for contrast processing the video input signal as recited in claims 1, 2, or 3, wherein a waveform representing the superimposed image of the compressed signal amplitude varying components on the video input signal which makes the optical illusion of brightness level is a waveform which varies smoothly at both sides of a boundary line in the picture.

9. A method for contrast processing the video input signal as recited in claim 5 wherein a waveform representing the superimposed image of the compressed signal amplitude varying components on the video input signal which makes the optical illusion of brightness level is a waveform which varies smoothly at both sides of a boundary line in the picture.

10. A method for contrast processing the video input signal as recited in claim 6, wherein a waveform representing the superimposed image of the compressed signal amplitude varying components on the video input signal which makes the optical illusion of brightness level is a waveform which varies smoothly at both sides of a boundary line in the picture.

11. A method for contrast processing the video input signal as recited in claims 1, 2, or 3, wherein the compressed signal components after being superimposed are expressed by a linear combination of a Gaussian function and a Gaussian integral function.

12. A method for contrast processing the video input signal as recited in claim 5, wherein the compressed signal components after being superimposed are expressed by a linear combination of a Gaussian function and a Gaussian integral function.

13. A method for contrast processing the video input signal as recited in claim 6, wherein the compressed signal components after being superimposed are expressed by a linear combination of a Gaussian function and a Gaussian integral function.

14. An apparatus for contrast processing a video input signal having a brightness level for display on a contrast display means and a plurality of signal amplitude varying components including low frequency components and high frequency components higher in frequency than said low frequency components, said apparatus including contrast improving means comprising:
   a. frequency component attenuating means for attenuating said low frequency components in the video input signal, said video input signal having brightness values,
   b. characteristic converting means for converting the output of said frequency component attenuating means, and
   c. means for superimposing the output of said characteristic converting means on the brightness level of the video input signal to produce a display signal to be displayed as a picture on said contrast display means.

15. An apparatus for contrast processing a video input signal having a brightness level for display on a contrast display device and a plurality of signal amplitude varying components including low frequency components and high frequency components higher in frequency than said low frequency components, said apparatus comprising:
   brightness level converting means for receiving the video input signal and for converting the brightness level of said video input signal to a converted brightness level which can be displayed with the contrast display device, and
   contrast improving means comprising:
   a. frequency component attenuating means for attenuating said low frequency components of said video input signal
   b. characteristic converting means for converting the output of said frequency component attenuating means, and
   c. adding means for superimposing the output of said characteristic converting means on the output of said brightness level converting means to produce a display signal which has improved contrast when displayed on the contrast display device.

16. An apparatus for contrast processing a video input signal having a self-emitting light level for display on a display device and a plurality of signal amplitude varying components including low frequency components and high frequency components higher in frequency than said low frequency components, said apparatus comprising:
   brightness level converting means for receiving said video input signal having a video signal gain, said video signal also having a self-emitting light level, and for increasing the video signal gain of the video input signal to produce a video output signal when the ratio of the self emitting light level to external light level is lower than a first predetermined value,
   frequency component attenuating means for attenuating said low frequency components from one of the video output signal and the video input signal,
   characteristic converting means for compressing amplitude portions between a predetermined range of said signal amplitude varying components, and
   adding means for adding the output of said characteristic converting means and the video output signal of said brightness level converting means to produce a display signal to decrease the effect of external light and to improve the contrast when the display signal is displayed on the display device.

17. An apparatus for contrast processing the video input signal as recited in claim 16, wherein the brightness level converting means has a variable brightness level conversion characteristic which varies in response to the amount of brightness of external light.

18. An apparatus for contrast processing the video input signal as recited in claims 14, 15, or 16, further comprising:
   means for detecting brightness varying portions of the video input signal corresponding to at least one of a brightness level above a predetermined value and brightness level below the predetermined value, and
   brightness level converting means for adjusting the brightness level of the brightness level above the predetermined value and the brightness level below the predetermined value of the detected brightness varying portions of the video input signal towards a center brightness level.

19. An apparatus for contrast processing the video input signal as recited in claims 14, 15, or 16, wherein the display signal has a contrast value and wherein the characteristic converting means has a signal compression characteristic which varies in response to the contrast value.

20. An apparatus for contrast processing the video input signal as recited in claim 18, wherein the display signal has a contrast value and wherein the characteristic converting means has a signal compression characteristic which varies in response to the contrast value.

21. An apparatus for contrast processing the video input signal as recited in claim 17, wherein the brightness level compensating means comprises:
   low frequency component attenuating means for attenuating the low frequency components in the video input signal, said video input signal having at least one picture element and a brightness level,
   absolute value calculating means for calculating the absolute value of the output of said low frequency component attenuating means,
   offsetting means for offsetting the brightness level of each picture element of the video input signal negatively by approximately a half of the number of graduation,
   multiplying means for multiplying the output of said absolute value calculating means by the output of said offsetting means for each picture element,
   characteristic converting means for converting the output characteristic of said multiplying means,
   low pass filter means for smoothing the output of said characteristic converting means, and
   subtracting means for subtracting the output of said low pass filter means from the output of said contrast improving means.

22. An apparatus for contrast processing the video input signal as recited in claims 14, 15, or 16 in which said frequency component attenuating means comprises:
   a low pass filter for making said video input signal smooth, and
   subtracting means for subtracting the output of said low pass filter from said video input signal.

23. An apparatus for contrast processing the video input signal as recited in claim 18 in which said frequency component attenuating means comprises:
   a low pass filter for making said video input signal smooth, and
   subtracting means for subtracting the output of said low pass filter from said video input signal.

24. An apparatus for contrast processing the video input signal as recited in claim 19 in which said frequency component attenuating means comprises:

a low pass filter for making said video input signal smooth, and subtracting means for subtracting the output of said low pass filter from said video input signal.

25. An apparatus for contrast processing the video input signal as recited in claim 20 in which said frequency component attenuating means comprises:

a low pass filter for making said video input signal smooth, and subtracting means for subtracting the output of said low pass filter from said video input signal.

26. A method for contrast processing the video input signal as recited in claim 4 further comprising the steps of:

detecting the brightness level and a distribution of brightness variation of the video input signal, determining from said detected brightness level whether portions of the video signal have one of a light brightness level and a dark brightness level;

compensating the brightness varying portions of the video input signal having the light brightness level to a darker brightness level; and compensating the brightness varying portions of the video input signal having the dark brightness level to a lighter brightness level;

wherein the brightness level of the brightness varying portions of the video input signal having one of the dark brightness level and the light brightness level are compensated so that the brightness varying portions can be displayed on a display device.

27. A method for contrast processing as recited in claim 4, wherein the video input signal and the level converted video signal each have a contrast value and wherein the step for compressing the signal varying components includes variable compressing the signal varying components having a large amplitude in response to said contrast value of one of the video input signal and level converted video signal.

28. A method for contrast processing the video input signal as recited in claim 4, wherein the waveform which makes an optical illusion of brightness level is an waveform which varies smoothly at both sides of the boundary line in the picture.

29. A method for contrast processing the video input signal as recited in claim 4, wherein the superimposed compressed signal components are expressed by a linear combination of a Gaussian function and a Gaussian integral function.

30. An apparatus for contrast processing the video input signal as recited in claim 17, further comprising:

means for detecting brightness varying portions of the video input signal corresponding to at least one of a light brightness level and dark brightness level, and brightness level converting means further for adjusting the brightness level of the light brightness level and the dark brightness level of the detected brightness varying portions of the video input signal towards a center brightness level.

31. An apparatus for contrast processing the video input signal as recited in claim 17, wherein the display signal has a contrast value and wherein the characteristic converting means has a signal compression characteristic which varies in response to the contrast value.

32. An apparatus for contrast processing the video input signal as recited in claim 17, in which said low frequency component attenuating means comprises:

a low pass filter for making said video input signal smooth, and subtracting means for subtracting the output of said low pass filter from said video input signal.

33. A method for contrast processing as recited in claim 1, wherein the video input signal and a level converted video signal produced by increasing a signal gain of the video input signal each have a contrast value and wherein the step for compressing the low frequency components includes variably compressing the low frequency components having an amplitude between a predetermined range in response to said contrast value of one of the video input signal and level converted video signal.

34. A method for contrast processing as recited in claim 2, wherein the video input signal and a level converted video signal produced by increasing a signal gain of the video input signal each have a contrast value and wherein the step for compressing the low frequency components includes variably compressing the low frequency components having an amplitude between a predetermined range in response to said contrast value of one of the video input signal and level converted video signal.

35. A method for contrast processing the video input signal as recited in claim 1 further comprising the steps of:

detecting the brightness level and a distribution of brightness variation of the video input signal, determining from said detected brightness level whether portions of the video signal have one of a brightness level above a predetermined value and a brightness level below the predetermined value;

compensating the brightness varying portions of the video input signal having the brightness level above the predetermined value to a lower brightness level; and compensating the brightness varying portions of the video input signal having the brightness level below the predetermined value to a higher brightness level;

wherein the brightness level of the brightness varying portions of the video input signal having one of the brightness level below the predetermined value and the brightness level above the predetermined value are compensated so that the brightness varying portions can be displayed on a display device.

36. A method for contrast processing the video input signal as recited in claim 2 further comprising the steps of:

detecting the brightness level and a distribution of brightness variation of the video input signal, determining from said detected brightness level whether portions of the video signal have one of a brightness level above a predetermined value and a brightness level below the predetermined value;

compensating the brightness varying portions of the video input signal having the brightness level above the predetermined value to a lower brightness level; and compensating the brightness varying portions of the video input signal having the brightness level below the predetermined value to a higher brightness level;

wherein the brightness level of the brightness varying portions of the video input signal having one of the brightness level below the predetermined value and the brightness level above the predetermined value are compensated so that the brightness varying portions can be displayed on a display device.

37. A method for contrast processing as recited in claim 35, wherein the video input signal and a level converted video signal produced by increasing a signal gain of the video input signal each have a contrast value and wherein the step for compressing the low frequency components includes variably compressing the low frequency components having an amplitude between a predetermined range in response to said contrast value of one of the video input signal and level converted video signal.

38. A method for contrast processing as recited in claim 36, wherein the video input signal and a level converted video signal produced by increasing a signal gain of the video input signal each have a contrast value and wherein the step for compressing the low frequency components includes variably compressing the low frequency components having an amplitude between a predetermined range in response to said contrast value of one of the video input signal and level converted video signal.

39. A method for contrast processing as recited in claim 1, wherein the predetermined range is five percent to thirty percent of the video input signal.

40. A method for contrast processing a video input signal as claimed in claim 1, wherein said compressing step, only said high frequency components are compressed.

41. A method for contrast processing a video input signal according to claim 1, wherein said step of superimposing said compressed signal amplitude varying components on said video input signal includes the step of performing addition of said compressed signal amplitude varying components with said video input signal.

42. A method for contrast processing a video input signal according to claim 2, wherein said step of superimposing said compressed signal amplitude varying components on said video input signal includes the step of performing addition of said compressed signal amplitude varying components with said video input signal.

43. A method for contrast processing a video input signal according to claim 3, wherein said step of superimposing said compressed signal amplitude varying components on said video input signal includes the step of performing addition of said compressed signal amplitude varying components with said video input signal.

44. A apparatus for contrast processing a video input signal according to claim 14, wherein said means for superimposing the output of said characteristic converting means on the brightness level of the video input signal includes means for performing addition of the output of said characteristic converter means with the brightness level of the video input signal.

45. An apparatus for contrast processing a video input signal according to claim 15, wherein said adding means performs addition of the output of said characteristic converting means with the output of said brightness level converting means.

* * * * *